Figure 1:
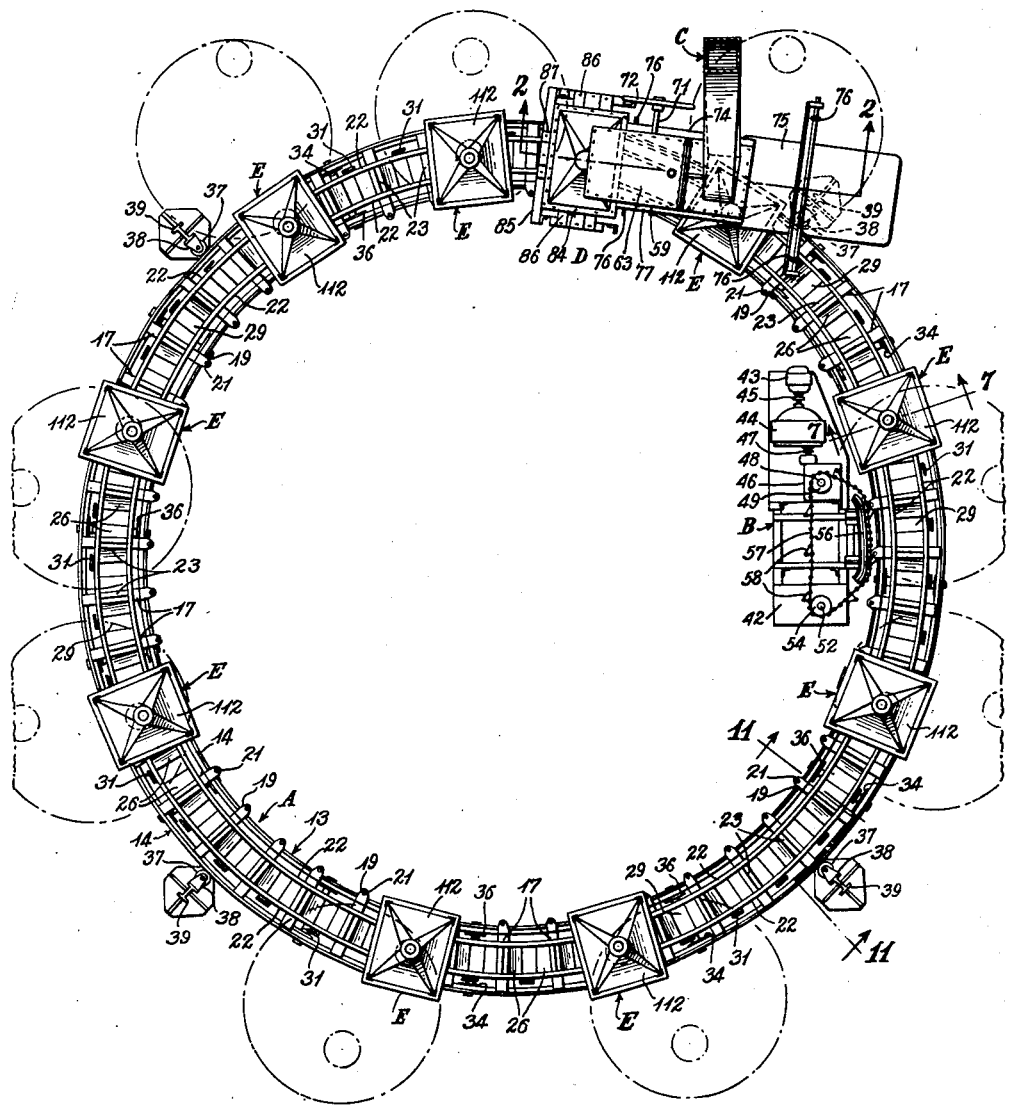

Dec. 31, 1957        A. MUSSCHOOT ET AL        2,818,162
                            FEEDER
Filed May 18, 1955                          9 Sheets-Sheet 1

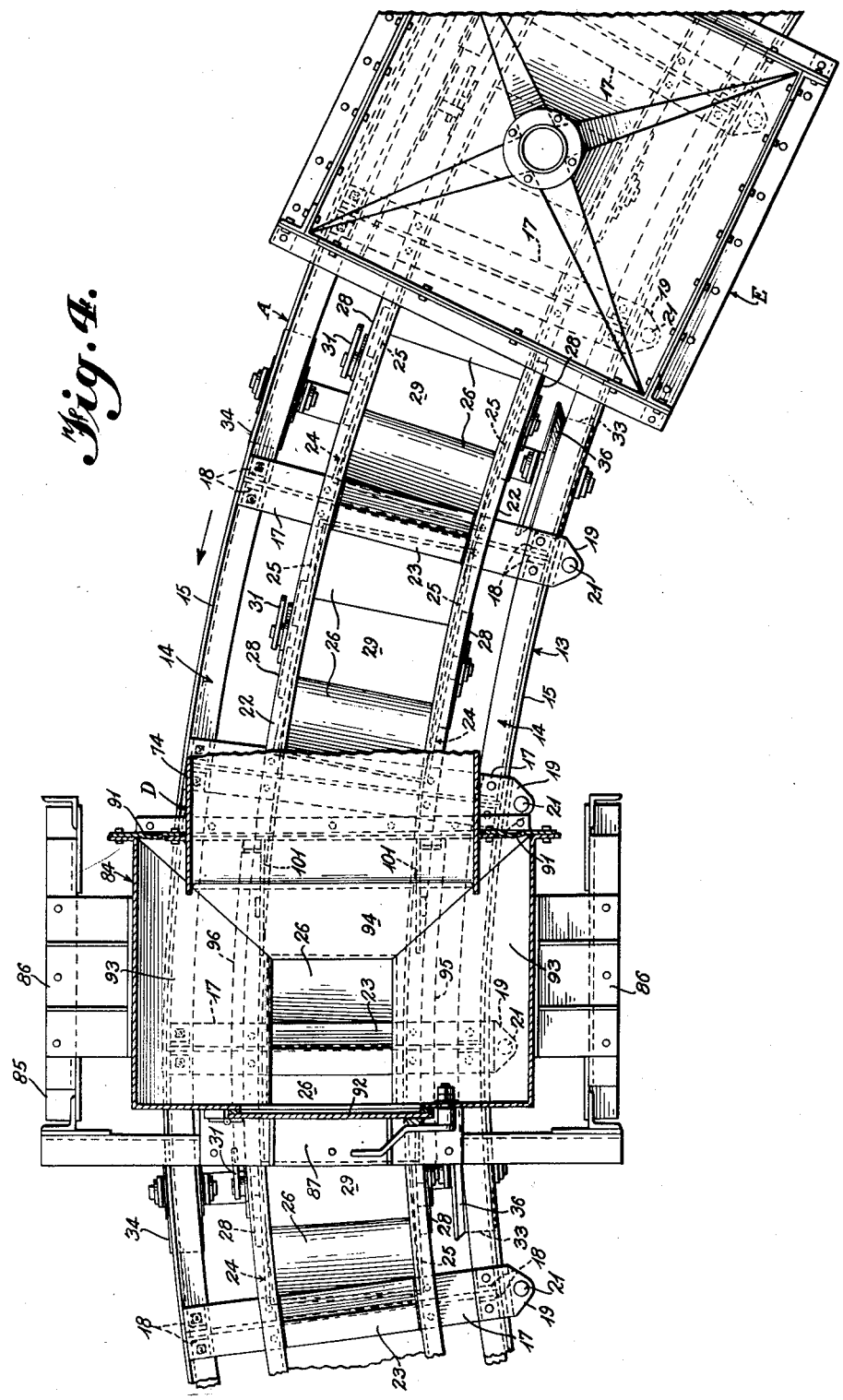

Dec. 31, 1957  A. MUSSCHOOT ET AL  2,818,162
FEEDER
Filed May 18, 1955  9 Sheets-Sheet 5
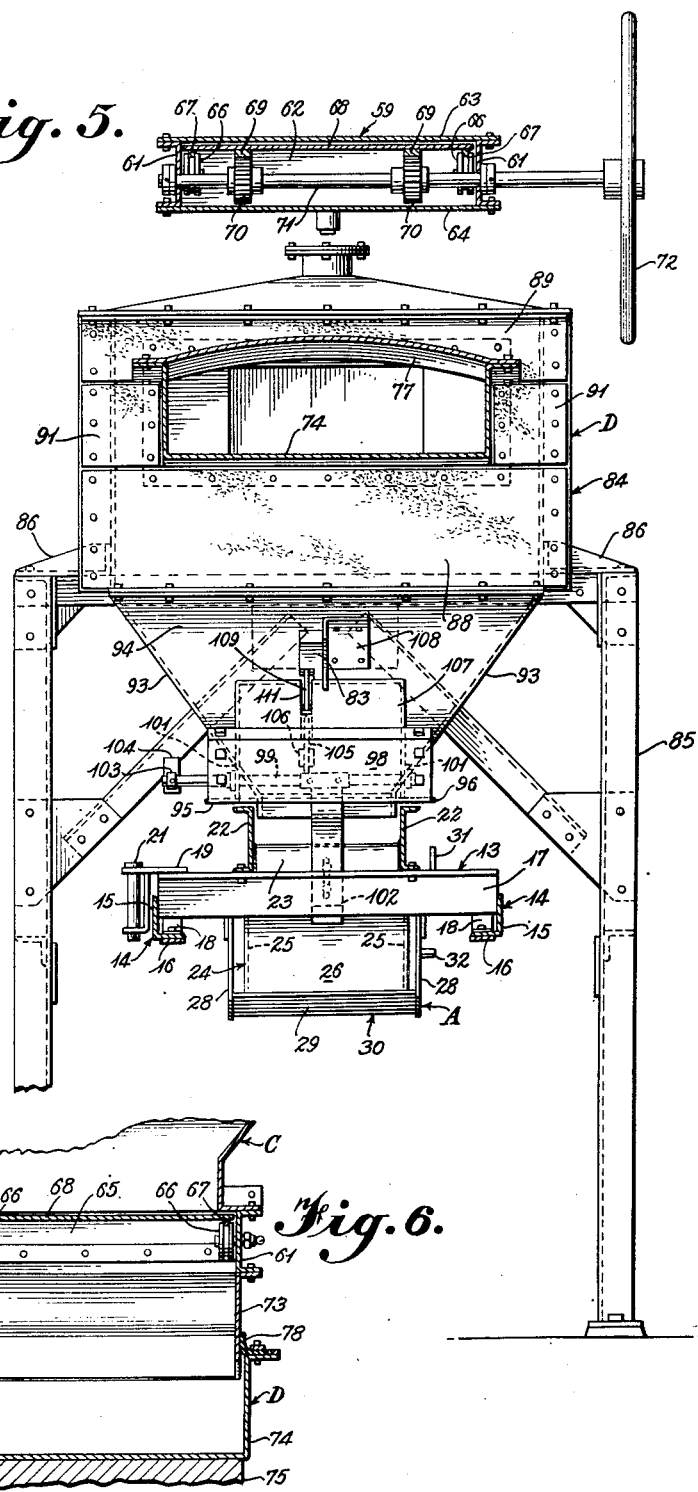

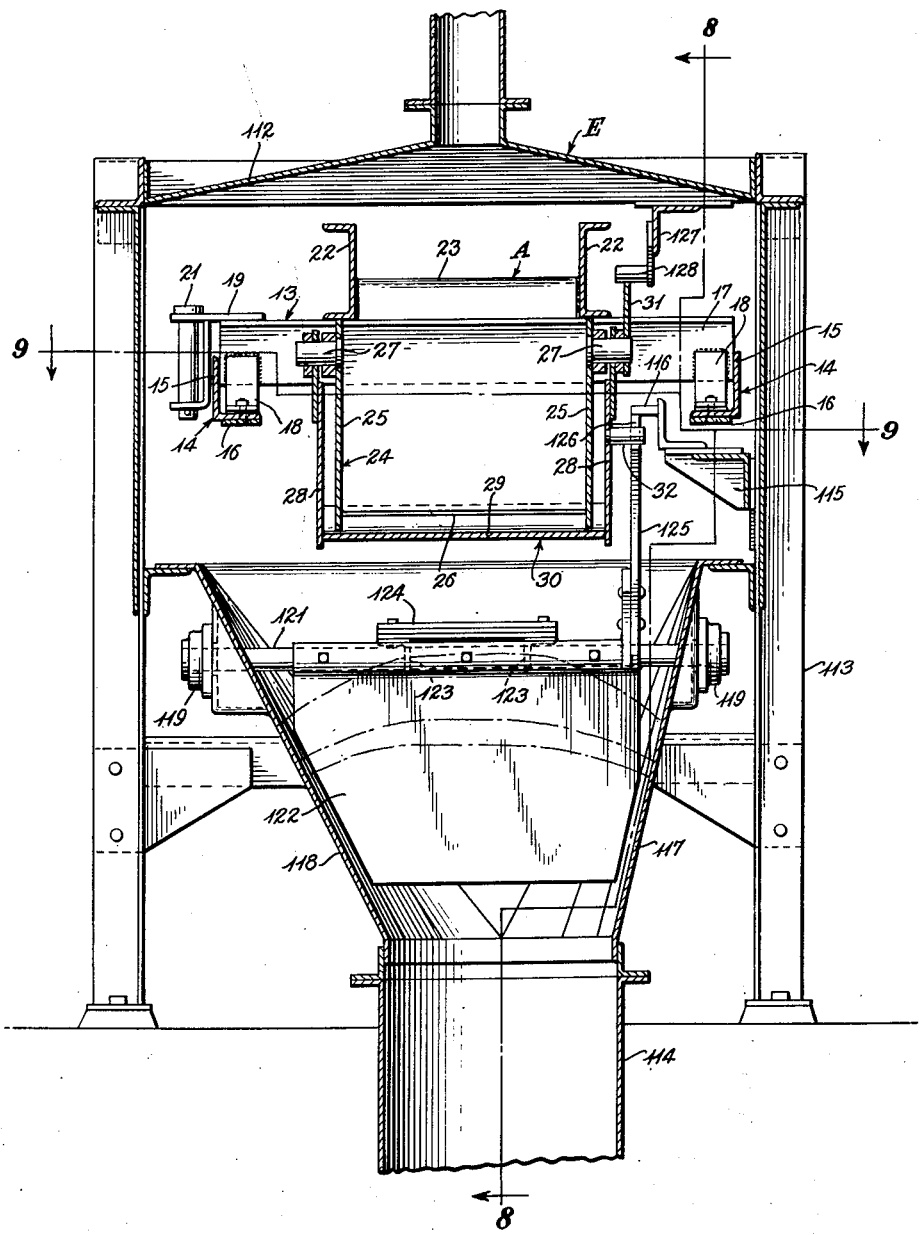

Dec. 31, 1957  A. MUSSCHOOT ET AL  2,818,162
FEEDER
Filed May 18, 1955  9 Sheets-Sheet 7

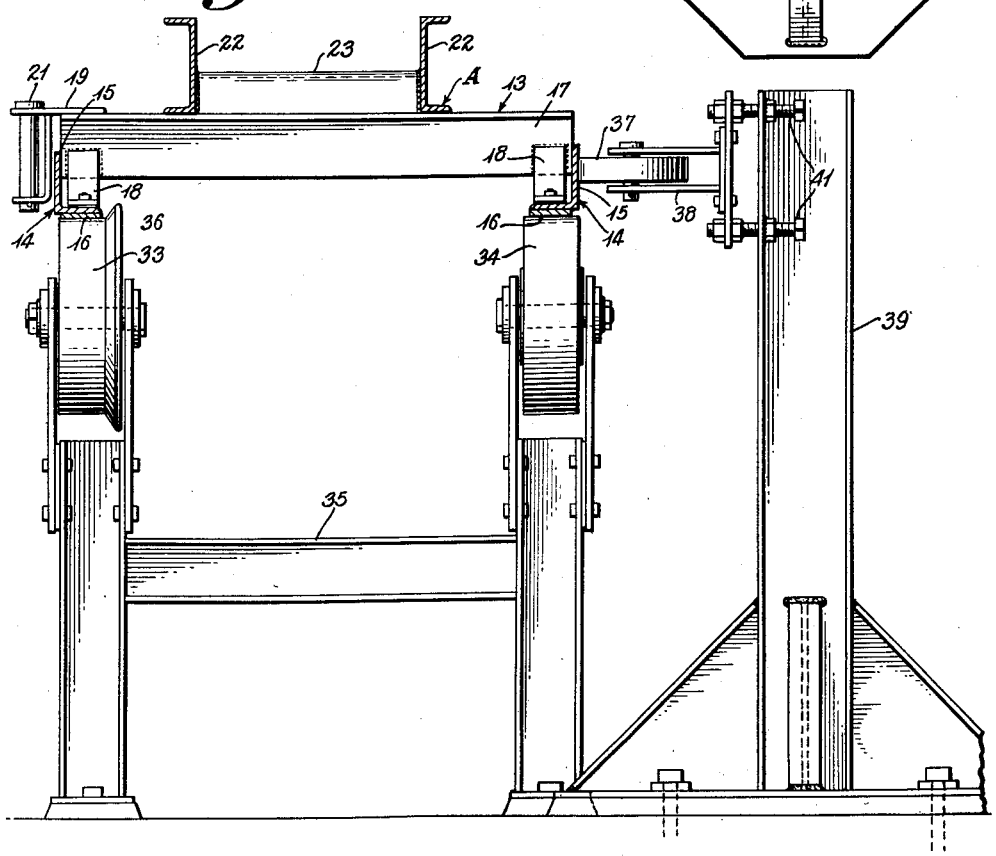

United States Patent Office 2,818,162
Patented Dec. 31, 1957

2,818,162

FEEDER

Albert Musschoot, Park Ridge, and David A. Davis, Chicago, Ill., assignors to Link-Belt Company, a corporation of Illinois Application May 18, 1955, Serial No. 509,255

14 Claims. (Cl. 198—46)

This invention relates to new and useful improvements in conveyor feeders and deals more particularly with a feeder which takes the form of a bucket carousel conveyor for delivering material from a source of supply to a plurality of discharge points.

In designing material processing plants, it is frequently desirable to provide a plurality of stations to which material is to be delivered from a single supply point. In other words, material is to be withdrawn from a single storage or supply hopper and distributed to a plurality of spaced processing stations. If the various processing stations require material intermittently or in varying amounts so that a constant rate of feed to each cannot be employed, prior types of feeders have required very close supervision to maintain an adequate amount of material on hand at all times at each of the stations. Further, difficulties have been encountered in the past in coordinating the flow of material to and from the feeder mechanism. For these and other reasons, known types of feeders for distributing material from a single source to a plurality of spaced stations have generally been manually controlled.

It is the primary object of this invention to provide a feeder for distributing material from a single supply point to a plurality of stations to automatically maintain an adequate amount of material on hand at all times at each of the stations.

A further important object of the invention is to provide a feeder for conveying material from a supply point to various stations selectively and in accordance with the different quantities of material required to be maintained on hand at each of the stations.

Still another important object of the invention is to provide an endless feeder from different portions of which material is selectively discharged at a plurality of stations and to which material is added from a single supply source in such amounts and at the proper locations on the feeder to replace the discharged material only.

Another object of the invention is to provide a continuously operating feeder from which material is automatically selectively discharged at a plurality of locations along a circular path and in accordance with the amount of material remaining at the locations so as to maintain a desired quantity of material on hand at each of the locations.

A still further object of the invention is to provide a feeder for continuously transporting material through a closed circular path from which measured quantities of material are selectively discharged at circumferentially spaced points along said path and to which like quantities of material are automatically added at one location along said path to replace the material discharged at said spaced points.

Other objects and advantages of the invention will be apparent during the course of the following description.

Figure 2:
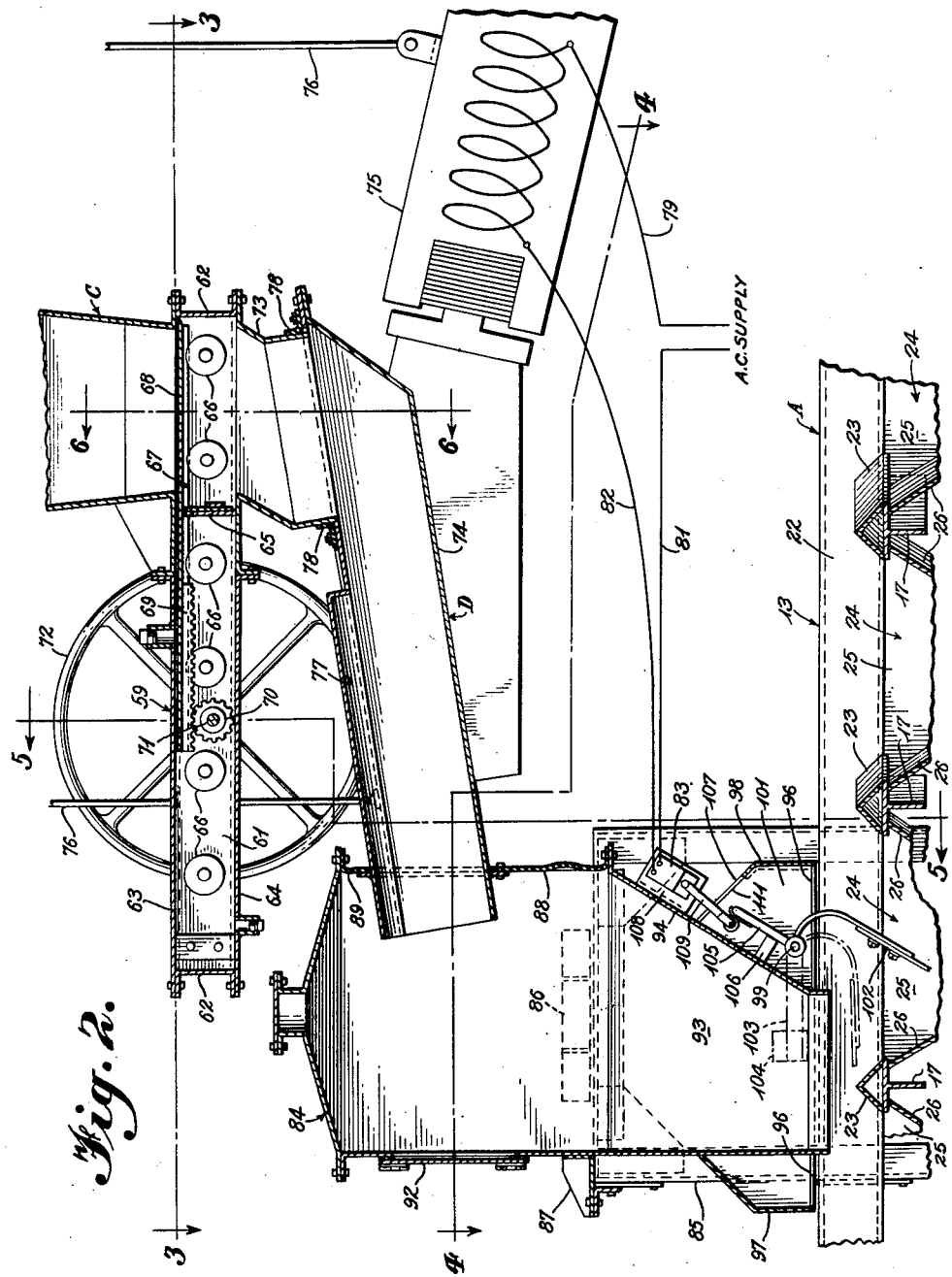
Figure 3:
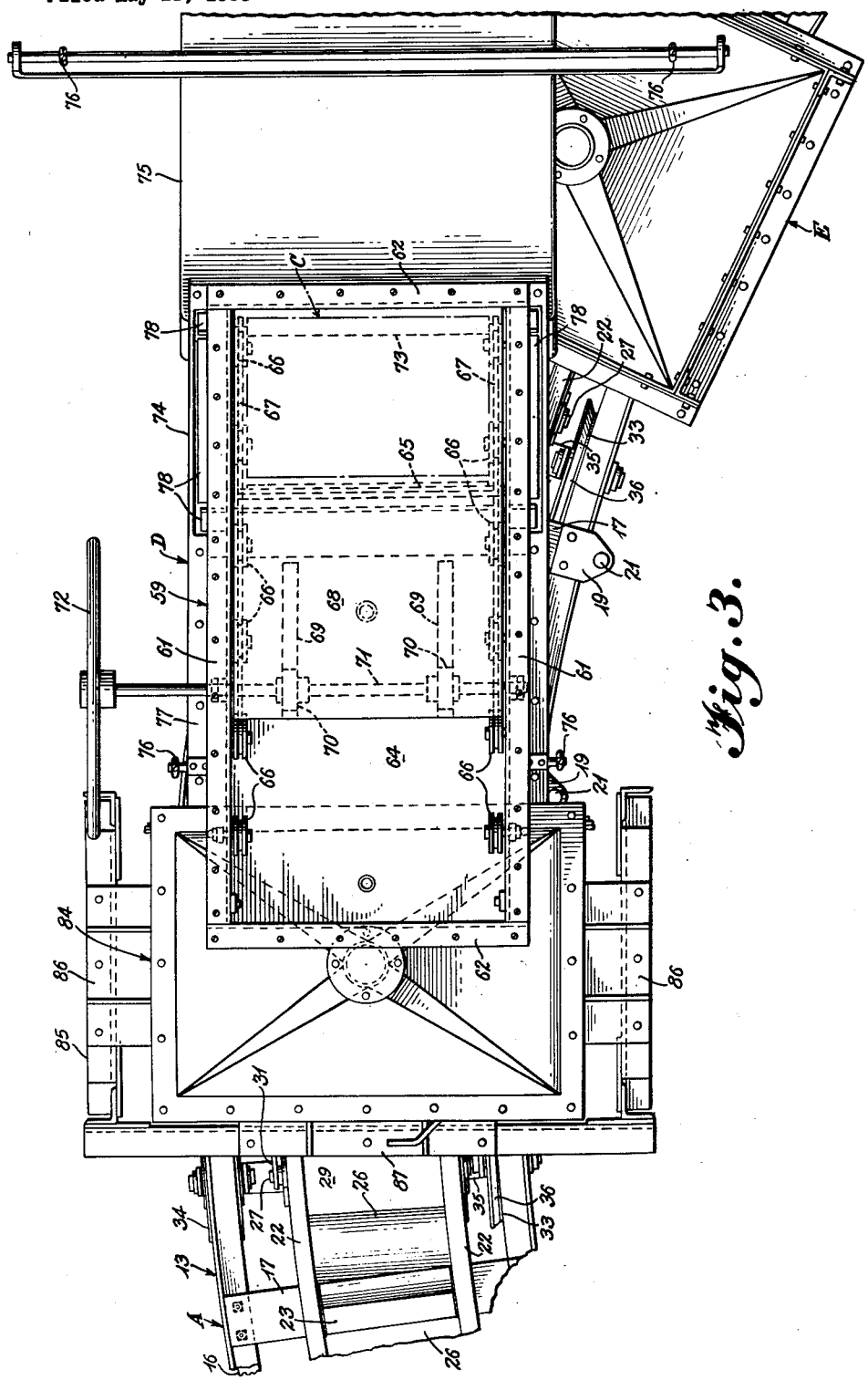
Figure 8:
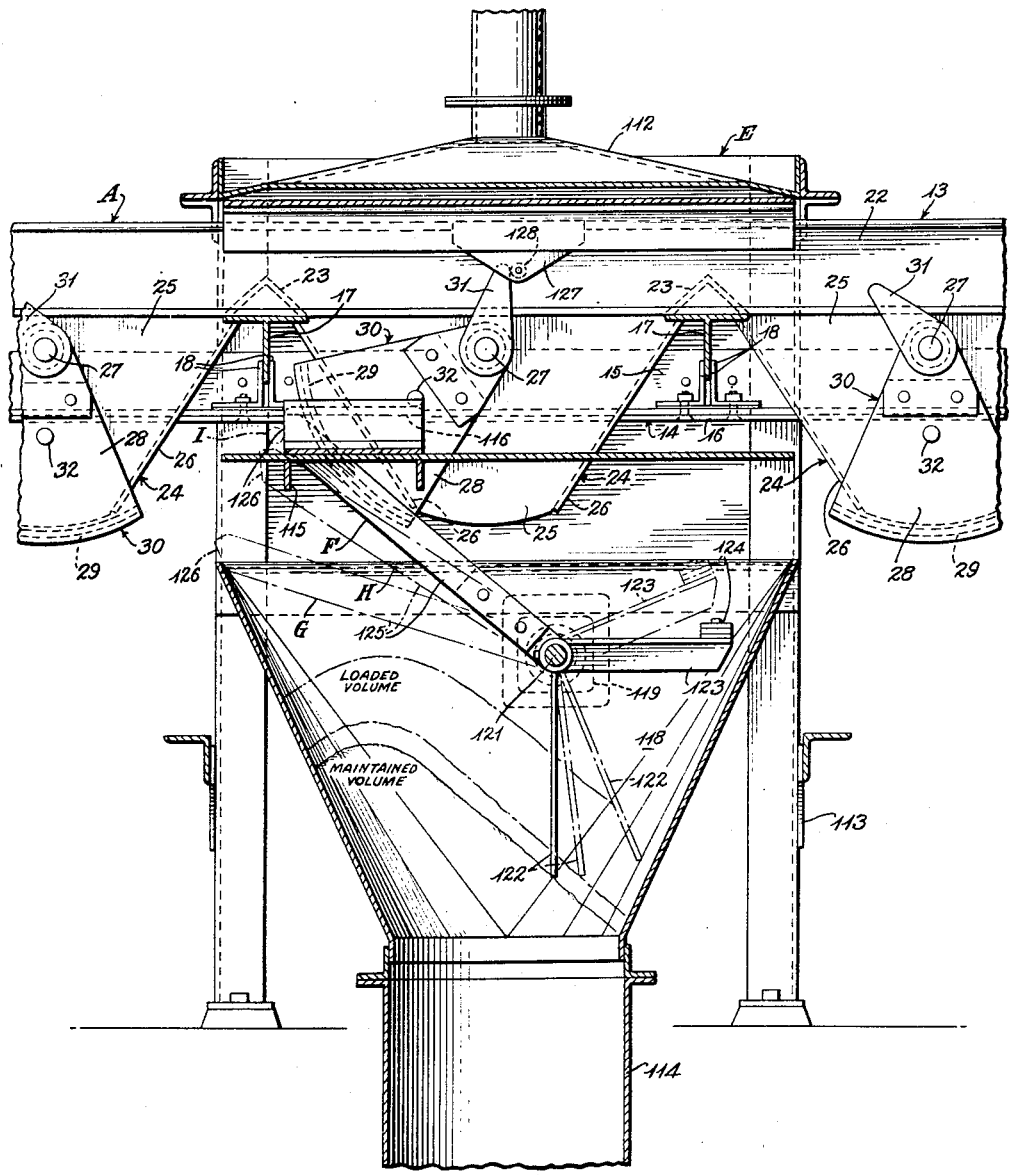
Figure 9:
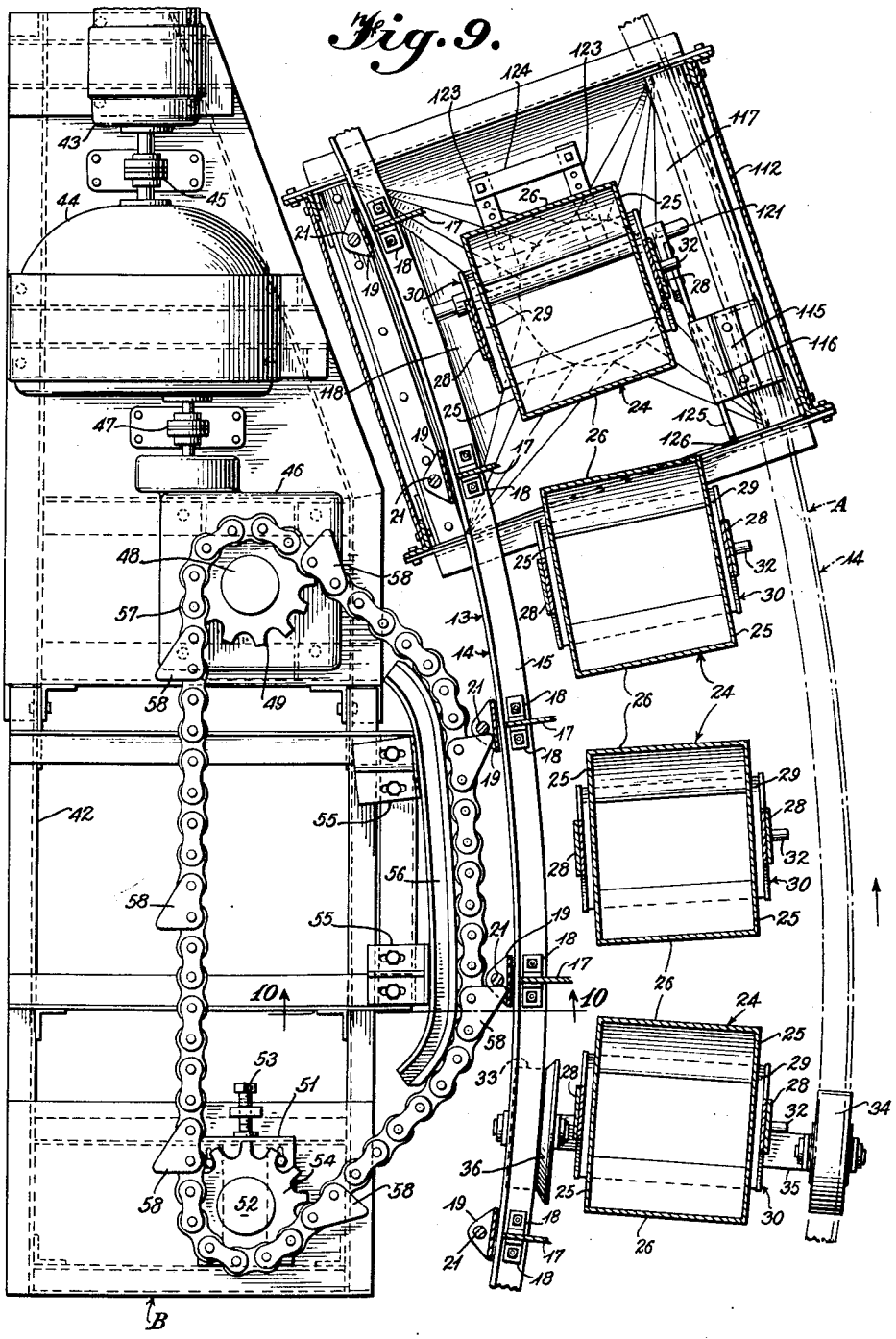

In the accompanying drawings forming a part of this specification and in which like reference characters are employed to designate like parts throughout the same, Figure 1 is a top plan view of a feeder embodying the invention, Figure 2 is a vertical sectional view taken on line 2—2 of Fig. 1, Figure 3 is a horizontal sectional view taken on line 3—3 of Fig. 2, Figure 4 is a horizontal sectional view taken on line 4—4 of Fig. 2, Figure 5 is a vertical sectional view taken on line 5—5 of Fig. 2, Figure 6 is a vertical sectional view taken on line 6—6 of Fig. 2, Figure 7 is a vertical sectional view taken on line 7—7 of Fig. 1, Figure 8 is a vertical sectional view taken on line 8—8 of Fig. 7, Figure 9 is a horizontal sectional view taken on line 9—9 of Fig. 7, Figure 10 is a fragmentary vertical sectional view taken on line 10—10 of Fig. 9, Figure 11 is a vertical sectional view taken on line 11—11 of Fig. 1, and Figure 12 is a top plan view of a tangential guide roller and its supporting structure shown in Fig. 11.

In the drawings, wherein for the purpose of illustration is shown the preferred embodiment of the invention, and first particularly referring to Fig. 1, it will be seen that the feeder of the invention includes an annular conveyor A which is rotated about its axis by the drive B. Material from the supply chute C is introduced to the conveyor A by the transfer device D and material is selectively discharged from the conveyor at any one of the discharge stations E which are identical and are arranged at circumferentially spaced points along the conveyor A.

Referring now to Figs. 1, 4, 7, 8 and 11 for a detail description of the conveyor A, it will be noted that the rigid annular frame 13 is provided with radially spaced concentric rails 14 formed of angle irons 15 the lower, horizontal flanges of which are provided with wear plates 16. Extending radially between the angle irons 15 at circumferentially spaced points around the frame 13 are a plurality of spacer beams 17 which are T-shaped in cross-section. The opposite end portions of the vertical webs of the beam 17 are connected to the rails 14 by brackets 18. Mounted on the inner end of each spacer beam 17 is a bracket 19 providing vertically aligned openings for receiving a drive pin 21 which is thereby supported at the inner circumference of the frame 13.

Extending around the frame 13 on the top flanges of the spacer beams 17 are two concentric circular channel members 22 which are arranged in radially spaced back-to-back relationship. Extending between the channel members 22 across the top of each beam 17 is an angle member 23 the flanges of which slope downwardly to the opposite edges of the top flange of the beam 17.

Between each pair of adjacent spacer beams 17, there is provided a bucket 24 formed of vertical side plates 25 and inclined end plates 26. The upper edges of the side plates 25 are welded or otherwise suitably connected to the bottoms of the channel members 22 and the upper edges of the end plates 26 are connected to and converge downwardly from the bottom surfaces of the top flanges of the spacer beams 17. Adjacent edges of the side and end plates 25 and 26 are connected to each other. A discharge opening is provided between the bottom edges of the side plates 25 and end plates 26.

Pivotally suspended from the stub axles 27, which extend outwardly from the side plates 25 of each bucket 24, are a pair of arms 28 having their free end portions arcuately formed and connected by a closure plate 29. The closure plate 29, therefore, is normally suspended in underlying relationship with the discharge opening of its associated bucket 24 and is pivotally movable to provide a gate 30 for controlling the flow of material through the discharge opening. Rigidly connected to the outer arm 28 of each gate 30 is a control arm 31 which projects angularly upwardly in a radial direction from the axis of pivotal movement of the gate for a purpose that will be later described. A control lug 32 extends outwardly from the outer arm 28 of each gate 30 at a point between the axis of pivotal movement of the gate and the closure plate 29. The purpose of the lug 32 will also be later described.

As best illustrated in Fig. 11, the annular frame 13 of the conveyor A is supported for movement about its vertical axis by a plurality of inner support wheels 33 and outer support wheels 34 which engage and underlie the rails 14 of the frame. The inner and outer support wheels 33 and 34, respectively, are arranged in pairs for rotation about axes which extend radially of the frame 13 and the pairs of support wheels are arranged at uniformly spaced points around the circumference of the frame. Each pair of support wheels 33 and 34 are arranged for rotation on a structurally reinforced frame 35 and the inner wheel 33 of each pair is provided with the flange 36 to prevent radial movement of the frame 13 on the support wheels. At four equally spaced points around the outer circumference of the frame 13, tangential guide wheels 37 are carried by brackets 38 for rotation about a vertical axis in contact with the outer surface of the angle iron 15 of the outer rail 14. As illustrated in Figs. 11 and 12, the brackets 38 are adjustably mounted on pedestals 39 by means of adjusting studs 41 to permit limited radial movement of the guide wheels 37 so as to maintain the frame 13 in properly centered relationship on the circumferentially arranged support wheels 33 and 34.

Referring now to Figs. 9 and 10 for a detail description of the drive B for imparting movement to the frame 13 about its vertical axis, it will be noted that the drive is provided with a suitable base 42 formed of structural members. At one end of the base 42 there is mounted a motor 43 which is drivingly connected to the input shaft of a conventional infinitely variable speed transmission unit 44 through a flexible coupling 45. The output shaft of the reduction unit 44 is connected to the input shaft of a gear type speed reducer 46 through a flexible coupling 47 and the output shaft 48 of the gear reducer 46 is vertically arranged and has mounted thereon a drive sprocket 49. The sprocket 49 is arranged at the same elevation as the drive pins 21 carried by the brackets 19 on the frame 13. At the opposite end of the base 42 from the motor 43 there is provided a take-up block 51 which rotatably supports the vertically arranged take-up shaft 52 and which is movable longitudinally of the base 42 by means of the adjusting stud 53. The take-up shaft 52 has mounted thereon a sprocket 54 in horizontal alignment with the drive sprocket 49.

Mounted on the side of the base 42 adjacent the frame 13 are a pair of laterally adjustable brackets 55 having mounted thereon a guide rail 56 which extends longitudinally of the base and the opposite end portions of which are curved into tangential alignment with the sprockets 49 and 54. Trained around the sprockets 49 and 54 and along the guide rail 56 is a conventional roller chain 57, spaced pitches of which are provided with driving attachments or dogs 58. The driving faces of the dogs 58 project outwardly in normal relationship with the outer face of the chain 57 and are backed-up for movement in driving engagement with the drive pins 21 of the frame 13 by the guide rail 56. It will be noted that the spacing between adjacent dogs 58 of the chain 57 is equal to the spacing between adjacent pins 21 of the frame 13 so that movement of the chain 57 around its sprockets 49 and 54 and along the rail 56 will cause the frame 13 to be driven at a uniform velocity. The velocity of the frame 13, of course, is adjustable by means of the variable speed transmission unit 44.

Referring now to Figs. 1, 2, 3, 5 and 6 for a detail description of the discharge end portion of the material supply chute C, it will first be noted that the chute is supported in any suitable manner and is in open communication with a storage or supply hopper, not shown, for the gravitational flow of material from the hopper into the chute. All four sides of the chute C are flanged outwardly at its discharge end for connection to the rectangular gate valve housing designated in its entirety by the reference character 59. The housing 59 is formed of side channel members 61 the corresponding end portions of which are connected to the flanges on opposite sides of the chute C while their other corresponding end portions project laterally from the chute. End channel members 62 extend between and connect the corresponding ends of the side channel members 61. The portion of the housing 59 which projects laterally from the chute C is closed at its top by a cover plate 63 and at its bottom by a pan 64. A seal 65 is positioned within the housing between the chute and the interior of the projecting portion of the housing.

Mounted in longitudinal alignment along the inner side of each of the side channel members 61 are a plurality of grooved rollers 66 for receiving the guide rails 67 on the bottom surface of the rectangular gate 68. The gate 68 is thereby supported for longitudinal movement on the rollers 66 between a position underlying the discharge opening of the chute C and a retracted position within the outwardly extending portion of the housing 59. Welded or otherwise suitably connected to the bottom surface of the gate 68 are a pair of racks 69 that are engaged by pinions 70 carried by the laterally extending shaft 71 which is journaled in the side channel members 61. The shaft 71 is provided with a hand wheel 72 at one side of the housing 59 so that rotation can be imparted to the shaft to cause the pinions 70 to effect longitudinal movement to the racks 69 and the gate 68. Connected to the bottom of the gate valve housing 59 directly beneath the discharge end of the chute C is a spout 73. It will be readily apparent that the proper flow of material from the chute C through the spout 73 will be obtained by adjustment of the position of the gate 68.

Referring now to Figs. 2 to 6, inclusive, for a detail description of the device D by means of which material is transferred from the chute C to the buckets 24 of the frame 13, and first particularly referring to Fig. 2, there is shown a trough 74 having an electro-magnetic, vibratory motor 75 mounted on the bottom portion thereof. The trough 74 and motor 75 are suspended by cables 76 which support the trough in an inclined position with its upper end portion directly below the spout 73 and its lower end portion directly above the path of the buckets 24 carried by the frame 13. A cover plate 77 extends across the top of the trough 74 from a point adjacent the spout 73 to its discharge end. Sufficient clearance is provided between all four sides of the spout 73 and the adjacent portions of the trough 74 and cover plate 77 to permit limited vibratory movement of the trough relative to the spout. Flexible sealing members 78 are fastened to the trough 74 and cover plate 77 for engagement with the four sides of the spout 73 to prevent the escape of dust, and the like.

The electro-magnetic motor 75 is connected to an alternating current source by a line 79 and by lines 81 and 82 which lead from the current supply to the limit switch 83 and from the limit switch to the motor 75, respectively, as illustrated schematically in Fig. 2. Actuation of the limit switch 83, therefore, controls the operation of the motor 75 by means of which the trough 74 is caused to vibrate and induce the flow of material from the chute C to the discharge end of the trough.

The discharge end portion of the trough 74 extends into a hopper bottom housing 84. As is best illustrated in Fig. 5, the housing 84 is mounted on a base 85 which straddles the frame 13 and is connected to the sides and front of the housing by brackets 86 and 87, respectively, to support the housing at an elevation above that of the frame 13. The rear of the housing 84, through which the trough 74 projects, is provided with flexible members 88, 89 and 91 which extend between and are connected, respectively, to the housing and the bottom, cover plate 77 and sides of the trough 74. The flexible members 88, 89 and 91 permit vibratory movement of the trough 74 relative to the housing 84 and substantially prevent the escape of dust or the like from the side of the housing through which the trough projects. An access door 92 is provided in the front of the housing 84 opposite the trough 74.

At the hopper bottom portion of the housing 84, the sides 93 and back 94 converge inwardly to provide a discharge opening between and slightly below the level of the top flanges of the channel members 22 of the frame 13. Welded to the opposite sides 93 of the housing 84 adjacent the discharge opening are two curved plates 95 and 96 which overlie the upper flanges of the inner and outer channel members 22, respectively, as best illustrated in Fig. 5. The plates 95 and 96 act as baffles to substantially eliminate the escape of dust, and the like, from the buckets 24 as material is introduced thereto. As best illustrated in Fig. 2, at the front of the housing 84, the plates 95 and 96 project forwardly and the space between the plates is covered by a boxlike structure 97 to further reduce the escape of dust from the buckets 24. A similar boxlike structure 98 substantially encloses the space between the plates 95 and 96 outwardly of the rear wall 94.

The structure 98 has a shaft 99 journaled in and extending laterally between its walls 99 for pivotally supporting an actuating arm or paddle 102. Rigidly connected to one end of the shaft 99 outwardly of the structure 98 is a radial arm 103 having a counterweight 104 at its outer end portion. An actuating lever 105 is rigidly connected to the arm 102 for pivotal movement therewith within the structure 98 and a stop 106 is mounted on the rear wall 94 to limit the pivotal movement of the actuating lever in one direction. By reference to Fig. 2, it will be readily apparent that the arm 102 will be pivoted into a depressed position by the counterweight 104 to move the actuating lever 105 into an operative position against the stop 106 when an empty bucket 24 passes beneath the housing 84. The arm 102, however, will be supported in a substantially horizontal position to maintain the actuating lever 105 in an inoperative position out of engagement with the stop 106 when the bucket 24, moving past the housing 84, is filled with material.

Mounted on the rear wall 94 adjacent the sloping top 107 of the structure 98 is a bracket 108 upon which is mounted the limit switch 83. The operating arm 109 of the limit switch 93 extends through a slot 111 in the top 107 of the structure 98 and is aligned with the actuating lever 105 for engagement thereby to close the limit switch when the actuating arm is moved into an operative position against the stop 106 and to open the limit switch when the actuating arm is supported in an inoperative position out of engagement with the stop.

The operation of the device D for transferring material from the chute C to the buckets 24 will be described in detail as follows:

As successive buckets 24 are moved beneath the discharge opening of the housing 84, the arm 102 will assume one or another of two different positions, depending upon whether or not the bucket is full of material. If the bucket 24 is full of material, the arm 102 will be supported by engagement with the material to maintain the actuating arm 105 in its inoperative position out of engagement with the stop 106. The limit switch 83, therefore, will remain open and no material will be introduced into the hopper bottom housing 84 from the trough 74. If, on the other hand, an empty bucket 24 moves beneath the housing 84, the arm 102 will drop into a depressed position within the bucket as soon as the angle member 23 at the leading end of the bucket clears the end of the arm. At this time, the actuating lever 105 will be moved into its operative position in engagement with the stop 106 and the arm 109 to close the limit switch 83 and energize the motor 75 which imparts vibratory movement to the trough 74. Material will thereupon flow from the discharge end of the trough 74 into the housing 84 and will fall through the discharge opening in the bottom of the housing into the empty bucket 24. This discharge of material from the trough 74 into the housing 84 will continue until the arm 102 is engaged by the angle member 23 at the rear of the bucket 24 which will lift the arm out of the bucket and will move the actuating lever 105 to its inoperative position to open the limit switch 83. Vibration of the trough 74 will thereupon cease and no more material will be introduced into the housing 84 until another empty bucket 24 moves beneath the housing.

It will be readily apparent, therefore, that the device D will operate intermittently and selectively to introduce material only to those buckets 24 from which the material has been previously discharged. Further, since the only frictional engagement with the material in the loaded buckets 24 is that of the arm 102, frictional drag on the frame 13 is reduced to a minimum and there can be no binding or clogging of the material at the discharge opening of the housing 84.

Referring now to Figs. 7, 8 and 9, for a detail description of one of the plurality of identical discharge stations E illustrated in Fig. 1 as being located at circumferentially spaced points along the frame 13, there is shown a hopper bottom housing 112 mounted on a suitable base 113 in such a position that the frame 13 passes through opposite sides of the housing. The discharge opening at the bottom of the housing 112 is provided with a spout 114 for directing the material from the housing to a point of use at some lower location.

Mounted on the inner face of the side of the housing 112 adjacent the radially outer side of the frame 13, is a bracket 115 upon which is mounted a substantially horizontal cam plate 116. The cam plate 116 projects inwardly into the vertical plane through which the control lugs 32 of the gates 30 are moved and the upper surface of the cam plate lies at an elevation above that of the control lugs when the gates are in their closed positions.

The outer side wall 117 and the inner side wall 118 of the hopper bottom portion of the housing 12 are provided with journals 119 for pivotally supporting the shaft 121 which extends across the housing beneath the frame 13. A plate 122, substantially conforming in elevational shape with the cross-sectional shape of the bottom portion of the housing 112, is mounted on the shaft 121 for pivotal movement therewith. A pair of arms 123 are connected to the plate 122 for movement therewith and extend radially outwardly of the shaft 121 in a direction at which the counterweight 124 at the outer ends of the arms will urge the plate to partake of pivotal movement toward the side of the housing 112 from which the frame 13 approaches. Also connected to the plate 122 and extending angularly upwardly therefrom is a camming arm 125 having a camming surface 126 at its outer end. The length and angular arrangement of the arm 125 relative to the plate 122 are such that pivotal movement of the plate toward the side of the housing 112 from which the frame approaches will cause the outer end of the arm to engage the bottom of the cam plate 116 with the camming surface 126 in vertical alignment with the end of the plate from which the control lugs 32 approach. When, however, the plate 122 is pivoted away from the side of the housing 112 from which the frame 13 approaches, the arm 125 is pivoted to lower the camming surface 126 out of the path of movement of the control lugs 32, as illustrated by broken-lines in Fig. 8.

Mounted near the top of the housing 112 adjacent the radially outer side of the frame 13 is a second bracket 127 upon which is mounted a control lug 128 which projects inwardly into the vertical plane through which the control arms 31 of successive gates 30 are moved. By reference to Fig. 8, it will be readily apparent that the elevation of the control lug 128 is such that the outer ends of the control arms 31 of successive gates 30 will engage the lug when the gates are moved to their open position and will clear the lug when the gates return to or remain in their closed positions.

The operation of the apparatus for selectively controlling the discharge of material at each of the stations E can best be explained by reference to Fig. 8, wherein the plate 122 and the arm 125 are shown in full-lines in an operative position F, and by broken-lines in inoperative positions G and H. It will be noted that when the material in the hopper bottom housing 112 is at its loaded volume, the level of the material is such that the weight of the material acting on the plate 122 will effect pivotal movement of the plate and the arm 125 into the inoperative position G. On the other hand, when the volume of the material in the housing 112 drops, the level of the material in the housing will drop and the plate 122 will be permitted to swing toward the side of the housing from which the frame 13 approaches under the action of the counterweight 124. This swinging movement of the plate 122 will continue until the material has been lowered to its maintained volume at which point the arm 125 will have been moved through the inoperative position H to its operative position F and the camming surface 126 will lie in vertical alignment with the leading edge of the cam plate 116.

Assuming that the arm 125 has been moved to its operative position F, the control lug 32 on the gate 30 of the next approaching bucket 24 will engage the camming surface 126 at the position indicated by broken-lines at I. Continued movement of the frame 13 will thereafter cause the control lug 32 to ride up the camming surface 126 as the gate 30 swings into its open position relative to the discharge opening of the bucket 24. The lug 32 will thereafter pass longitudinally along the cam plate 116 to hold the gate 30 in its open position while the material is discharged from the bucket 24. This discharge of material into the hopper bottom of the housing 112 will again return the plate 122 and arm 125 to their inoperative position G by raising the level of the material in the housing to the loaded volume level. As the control lug 32 is moved off of the cam plate 116, the arm 31 of the bucket 30 will engage the control lug 128 in the housing 112 to swing the gate 30 back to its closed position relative to the discharge opening of the bucket 24. Positive closing of the gate 30 is thereby assured before the associated bucket 24 moves out of the housing 112.

It will be readily apparent from the above description that the material within the housing 112 will at all times be maintained at a level between the loaded and maintained volumes indicated in Fig. 8.

To summarize the previously discussed operation of the various component parts of the feeder, the drive B is first set into operation to effect movement of the frame 13 about its vertical axis. This movement of the frame 13 will cause successive buckets 24, carried by the frame, to be moved beneath the discharge opening of the hopper bottom housing 84 of the device D for transferring material from the supply chute C to the buckets. If the bucket 24 moving beneath the discharge opening of the housing 84 is empty, the arm 102 will swing downwardly into the bucket and will cause the limit switch 83 to be closed to energize the motor 75 which vibrates the trough 74 to discharge material into the housing for flow into the empty bucket. If, however, the bucket 24 moving beneath the discharge opening of the housing 84 is full of material, the arm 102 will be supported in an inoperative position and the limit switch 83 will remain open so that no material will be discharged from the trough 74 for flow into the bucket.

As the buckets 24 are moved with the frame 13 through the annular path of the latter, they will pass successively through each of the hopper bottom housings 112 at the circumferentially spaced discharge stations E. If the volume of material in a particular hopper bottom housing 112 is above its maintained value, the arm 125 will be maintained in an inoperative position and the control lug 32 on the gate 30 of each bucket 24 will pass beneath the cam plate 116 so that no material will be discharged from the buckets. On the other hand, if the material in such housing 112 has been reduced to its maintained volume, the arm 125 will be swung into its operative position for engaging the control lug 32 to swing the gate 30 of the bucket 24 moving through the housing into its open position for discharging the material from the bucket into the housing. If the gate 30 opened at one of the stations E is associated with a bucket 24 that has been discharged at a preceding station E, the arm 125 will remain in its operative position to open the gates 30 of succeeding buckets until sufficient material has been discharged in the housing 112 to increase the volume of the material to a value above the maintained value.

The carrying capacity of the buckets 24 is fixed by the design of the buckets. The rate of movement of the frame 13, however, is variable by adjustment of the transmission 44 to provide a rate of feed of material at which the desired volume of material will be maintained at all of the stations E. In other words, the rate of movement of the frame 13 is adjustable so that even if the material at all of the stations E through which the buckets 24 pass is being withdrawn or used at a maximum rate, the last station E through which the buckets pass before additional material is introduced thereto will receive an adequate supply of material to maintain the volume at the desired level.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, we claim:

1. A feeder, comprising a rigid annular frame supported for movement about its axis in a substantially horizontal plane, means for moving said frame, material receiving means carried by said frame and arranged circumferentially thereof, said material receiving means providing a plurality of circumferentially spaced bottom discharge openings, a movable closure for each of said discharge openings gravitationally biased into closing relationship with its associated opening, separate support means associated with each of said closures for supporting the entire weight of the latter, said support means being mounted for movement with said frame, opening means associated with each of said closures, conditionally effective closure operating means mounted at spaced stations along the path of movement of said frame adapted to cooperate with said opening means to open the closures during their successive movements past said stations to permit the material adjacent said closures to flow from said material receiving means, separate means associated with each closure operating means to condition the latter in response to the qunatity of the material at the station, said conditioning means being adapted to render said operating means effective when the quantity of material at the station falls below a predetermined amount and ineffective when the quantity exceeds that amount, material supply means mounted adjacent the path of movement of said frame, and means operatively associated with said supply means and actuated by movement of an emptied portion of the material receiving means thereby for withdrawing material from said supply means and for discharging material in spaced relationship above the emptied portion of the material receiving means to replace the material discharged from the latter means at one or more of said spaced stations.

2. A feeder as defined in claim 1 further characterized by said annular frame having radially spaced supporting rails, a plurality of circumferentially spaced support wheels mounted for engagement with said rails to support said frame for rotation about its axis, and means for engaging said frame to prevent radial movement of the latter on said support wheels.

3. A feeder as defined in claim 1 further characterized by said material receiving means having a plurality of separate buckets each having a bottom discharge opening, the closure for each discharge opening being pivotally suspended to hang in closing relationship with its associated opening, and the closure operating means at each station being movable to an operative position for engaging the opening means and swinging the closures out of said closing relationship during successive movements of the closures past the station and to an inoperative position to permit the closures moving past the station to remain in said closing relationship.

4. A feeder as defined in claim 3 further characterized by each closure operating means being mounted for pivotal movement between its operative and inoperative positions, and the means for moving each closure operating means including a plate carried by the latter in a position to be deflected by the accumulation of a given quantity of material at the station, the deflection of said plate effecting pivotal movement of the associated closure operating means into its inoperative position.

5. A feeder as defined in claim 1 further characterized by said material withdrawing and discharging means associated with said supply means including an arm pivotally mounted adjacent the path of movement of said frame and movable to an inoperative position by engagement with material in said receiving means and to an operative position when an emptied portion of the receiving means is moved thereby, and means actuated by movement of said arm to its operative position for discharging material to fill the empty portion of said receiving means.

6. A feeder, comprising a rigid annular frame supported for movement about its axis in a substantially horizontal plane, a drive for moving said frame, a plurality of buckets carried by said frame and arranged circumferentially thereof, each of said buckets having a bottom discharge opening, a gate mounted on each bucket for swinging movement into and away from a normal position across the discharge opening of the bucket to control the flow of material therefrom, a plurality of gate operating cams mounted at spaced stations along the path of movement of said frame, means associated with said cams for urging the latter into positions for engaging and swinging said gates away from their discharge openings as the buckets move past said stations, means holding the cam at each station out of its position for engaging said gates when a given quantity of material has accumulated at the station, material supply means, an actuating arm pivotally mounted above the path of movement of said frame for swinging movement into empty buckets moved thereby, said arm being supported in an inoperative position by engagement with material in the buckets, and means actuated by movement of said arm into an empty bucket for withdrawing material from said supply means and for discharging at a point above the bucket a sufficient quantity of material to fill the latter.

7. A feeder as defined in claim 6 further characterized by said gate operating cams being pivotally supported and having counterweights for urging the cams into positions to engage and swing the gates away from their normal positions across the bucket discharge openings, and means at each of said stations for engaging each gate that is displaced from its normal position to positively return the gate to its normal position before the associated bucket is moved away from the station.

8. A feeder as defined in claim 7 further characterized by each cam having rigidly connected thereto a plate arranged for engagement with and movement by a given quantity of the material accumulated at said station to move and hold the cam out of the position at which it will engage said gates.

9. A feeder as defined in claim 6 further characterized by said means for withdrawing material from the supply means and discharging material to the buckets comprising a supply chute for the material, transfer means for receiving material from said chute and discharging it to the bucket into which said actuating arm has moved, and a drive for operating said transfer means, said drive being set in operation by movement of said arm into an empty bucket.

10. A feeder as defined in claim 9 further characterized by said transfer means comprising a trough having a discharge end portion overlying the successive buckets with which said actuating arm is associated and having a material receiving end portion beneath said chute, an electrically energized drive for vibrating said trough to effect discharge of material therefrom, and a switch for controlling energization of said drive, said switch being closed to energize the drive by movement of the actuating arm into an empty bucket.

11. A feeder, comprising a rigid annular frame supported for movement about its axis in a substantially horizontal plane, a drive for moving said frame, a plurality of buckets carried by said frame and arranged circumferentially thereof, each of said buckets having a bottom discharge opening, a gate mounted on each bucket for pivotal movement into and away from a normal position across the discharge opening of the bucket to control the flow of material therefrom, a plurality of gate operating cams mounted at spaced stations along the path of movement of said frame for pivotal movements into and out of positions for engaging and swinging said gates away from their discharge openings as the buckets move past said stations, each of said cams having a counterweight for normally urging the cam into its position for engaging the gates and a plate for engagement with and movement by a given quantity of material accumulated at said station to move and hold the cam out of its position for engaging the gates, an actuating arm pivotally mounted above the path of movement of said frame for swinging movement into empty buckets moved thereby, said arm being supported in an inoperative position by engagement with material in the buckets, a switch operated by movement of said arm into an empty bucket, a material supply chute, and a transfer device actuated by operation of said switch for transferring material from said chute to a discharge point above the bucket into which said arm has moved.

12. A feeder as defined in claim 11 further characterized by the cam at each of said stations comprising an arm having a camming surface at one end thereof, a shaft rigidly connected to said arm and rotatably mounted in overlying relationship with the material accumulated at the station to support the arm for pivotal movement of its camming surface into and out of a position for engaging said gates, a counterweight mounted on said shaft for urging said arm to move its camming surface into a position for engaging said gates, and a plate connected to said shaft for movement against the action of said counterweight by engagement with the material accumulated at said station to move said arm and its camming surface out of said postion for engaging the gates.

13. A feeder as defined in claim 12 further characterized by each of said gates having a control lug projecting laterally outwardly therefrom and a control arm connected thereto in radial relationship with the axis of pivotal movement of the gate, the camming surface at each station being movable into and out of a position in the path of movement of said control lugs for engaging the lugs to swing the gates away from their discharge openings, and a stationary control lug mounted at each of said stations in alignment with the path of movement of the control arms of those gates which have been moved away from their discharge openings to positively return the gates to their closed positions.

14. A feeder as defined in claim 11 further characterized by said transfer device comprising a trough having one end portion positioned beneath said chute for receiving material therefrom and the other end portion positioned above the path of movement of the buckets for discharging material into the latter, and an electromagnetic motor connected to said trough and actuated by operation of the switch for imparting vibratory movement to the trough to induce the flow of material along said chute and from the discharge end portion thereof into said buckets.

References Cited in the file of this patent

UNITED STATES PATENTS

| | | |
|---|---|---|
| 1,156,446 | Taylor et al. | Oct. 12, 1915 |
| 1,666,027 | Beaumont | Apr. 10, 1928 |
| 1,912,335 | Schweickert | May 30, 1933 |
| 2,342,038 | Davis | Feb. 15, 1944 |
| 2,342,039 | Davis | Feb. 15, 1944 |
| 2,638,248 | Alvord | May 12, 1953 |